(12) United States Patent
Hu

(10) Patent No.: US 12,255,346 B1
(45) Date of Patent: Mar. 18, 2025

(54) LAMP WITH QUICK-RELEASE BATTERY

(71) Applicant: Sufang Hu, Shantou (CN)

(72) Inventor: Sufang Hu, Shantou (CN)

( * ) Notice: Subject to any disclaimer, the term of this patent is extended or adjusted under 35 U.S.C. 154(b) by 0 days.

(21) Appl. No.: 18/940,429

(22) Filed: Nov. 7, 2024

(30) Foreign Application Priority Data

Sep. 24, 2024 (CN) .......................... 202422336349.4

(51) Int. Cl.
| | |
|---|---|
| *H01M 50/264* | (2021.01) |
| *F21S 8/00* | (2006.01) |
| *F21S 8/06* | (2006.01) |
| *F21S 9/02* | (2006.01) |
| *F21V 21/096* | (2006.01) |
| *F21V 23/06* | (2006.01) |
| *H01M 50/244* | (2021.01) |
| *H01M 50/262* | (2021.01) |
| *H01M 50/267* | (2021.01) |

(52) U.S. Cl.
CPC ........... *H01M 50/264* (2021.01); *F21S 8/036* (2013.01); *F21S 8/063* (2013.01); *F21S 9/02* (2013.01); *F21V 21/096* (2013.01); *F21V 23/06* (2013.01); *H01M 50/244* (2021.01); *H01M 50/262* (2021.01); *H01M 50/267* (2021.01); *F21V 21/0965* (2013.01)

(58) Field of Classification Search
CPC ............. H01M 50/267; H01M 50/262; H01M 50/244; F21S 8/063; F21S 9/02; F21S 8/036; F21V 21/096; F21V 23/06; F21V 21/0965; H02J 7/0042
USPC .......................................... 362/191, 194, 398
See application file for complete search history.

(56) References Cited

U.S. PATENT DOCUMENTS

| | | | |
|---|---|---|---|
| 5,868,790 A * | 2/1999 | Vincent | ................ A61N 1/3975 607/5 |
| 6,874,916 B2 | 4/2005 | Wu | |
| 2024/0159366 A1 | 5/2024 | Huang et al. | |

FOREIGN PATENT DOCUMENTS

| | | |
|---|---|---|
| CN | 218274947 U | 1/2023 |
| CN | 220749972 U | 4/2024 |
| CN | 221301144 U | 7/2024 |

\* cited by examiner

*Primary Examiner* — Laura K Tso

(57) ABSTRACT

The present invention relates to a lamp with a quick-release battery, which is technically characterized by including a lamp holder, a lamp body, and a battery pack. A battery compartment with an opening at one side and capable of allowing the battery pack to be inserted is arranged in the lamp holder, a sub-buckle is arranged on an end face of the battery pack, a clamping component capable of being clamped and mated with the sub-buckle is arranged on a corresponding side wall of the battery compartment, the clamping component includes a clamping box, a sliding block capable of sliding inside and outside is arranged in the clamping box, and an elastic female buckle capable of extending out or retracting into the clamping box and capable of being clamped and mated with the sub-buckle when retracting into the clamping box is arranged at an outer end of the sliding block.

9 Claims, 3 Drawing Sheets

LAMP WITH QUICK-RELEASE BATTERY

CROSS-REFERENCE TO RELATED APPLICATIONS

The application claims priority of Chinese patent application CN2024223363494, filed on Sep. 24, 2024, which is incorporated herein by reference in its entireties.

TECHNICAL FIELD

The present invention relates to the technical field of lamps, and in particular, to a lamp with a quick-release battery.

BACKGROUND

A wireless lamp fixed on the wall is usually provided with a battery pack. However, the battery pack needs to be replaced frequently or removed for charging. The existing wireless lamp usually adopts a traditional battery compartment design, and a user needs to open the cover of the battery compartment before taking out or putting in the battery. This design makes the battery replacement process complicated and time-consuming, which is not convenient. When the battery is mounted on the wall, the user may need to complete the battery replacement by using tools or adopting uncomfortable postures, which not only increases the difficulty of operation but also may pose a safety hazard.

Therefore, it is necessary to further improve and perfect the prior art to overcome these defects, and the present invention is made based on this situation.

SUMMARY

To overcome the defects in the prior art, the present invention aims to provide a lamp with a battery that is easy to disassemble and assemble quickly. This lamp not only simplifies the operation steps of battery replacement, but also improves the replacement efficiency.

The present invention is implemented by the following technical solutions.

To solve the technical problem, the present invention provides a lamp with a quick-release battery, which includes a lamp holder, a lamp body, and a battery pack. A battery compartment with an opening at one side and capable of allowing the battery pack to be inserted is arranged in the lamp holder, a sub-buckle is arranged on an end face of the battery pack, a clamping component capable of being clamped and mated with the sub-buckle is arranged on a corresponding side wall of the battery compartment, the clamping component includes a clamping box, a sliding block capable of sliding inside and outside is arranged in the clamping box, an elastic female buckle capable of extending out or retracting into the clamping box and capable of being clamped and mated with the sub-buckle when retracting into the clamping box is arranged at an outer end of the sliding block, and a pressing-type elastic self-locking mechanism is arranged between the sliding block and the clamping box.

To further solve the technical problem to be solved in the present invention, according to the lamp with the quick-release battery provided by the present invention, the pressing-type elastic self-locking mechanism includes a guide groove arranged on the sliding block, a pull rod rotatably connected in the clamping box, and a reset spring that is arranged between the sliding block and the clamping box and elastically presses the sliding block outwards, and a free end of the pull rod is inserted into the guide groove and can slide unidirectionally along the guide groove; and the guide groove includes a front extension section extending from backward to forward, a rear turning section turning backward from the front extension section, a front turning section turning forward from the rear turning section, and a rear extension section extending backward from the front turning section, the front extension section, the rear turning section, the front turning section, and the rear extension section are connected end to end in sequence, and a stopping groove is provided at the connection between the rear turning section and the front turning section.

To further solve the technical problem to be solved in the present invention, according to the lamp with the quick-release battery provided by the present invention, steps that descend in sequence are arranged between the front extension section and the rear turning section, between the rear turning section and the front turning section, between the front turning section and the rear extension section, and between the rear extension section and the front extension section.

To further solve the technical problem to be solved in the present invention, according to the lamp with the quick-release battery provided by the present invention, the female buckle includes two elastic arms arranged oppositely, and a space for inserting the sub-buckle is formed between the two elastic arms; and when the female buckle moves backward to retract into the clamping box, the two elastic arms approach each other and clamp the sub-buckle.

To further solve the technical problem to be solved in the present invention, according to the lamp with the quick-release battery provided by the present invention, a guiding groove is arranged on a side surface of the battery pack, and a guide rail that can slidably cooperate with the guiding groove is arranged on a corresponding side surface of the battery compartment.

To further solve the technical problem to be solved in the present invention, according to the lamp with the quick-release battery provided by the present invention, the lamp holder is detachably connected with a mounting plate that can be mounted on a wall.

To further solve the technical problem to be solved in the present invention, according to the lamp with the quick-release battery provided by the present invention, a magnetic connection structure for detachably connecting the lamp holder and the mounting plate is arranged between the lamp holder and the mounting plate.

To further solve the technical problem to be solved in the present invention, according to the lamp with the quick-release battery provided by the present invention, the magnetic connection structure includes a plurality of magnets arranged on the lamp holder, and the mounting plate is made of iron.

To further solve the technical problem to be solved in the present invention, according to the lamp with the quick-release battery provided by the present invention, a conductive plug and a conductive socket which can be mutually plugged into each other are respectively arranged on the battery pack and a corresponding side wall of the battery compartment.

Compared with the prior art, the present invention has the following advantages.

The battery pack of the present invention is simple, convenient and quick in disassembly and assembly processes. When the battery is mounted, the battery pack only needs to be pushed directly into the battery compartment, and the sub-buckle on the end face of the battery pack can automatically clamp to the female buckle to achieve quick mounting. When the battery pack is disassembled, the battery pack may be automatically popped up only by pressing the battery pack again, and the battery pack can be easily taken out. This design greatly simplifies the battery replacement and charging process and improves the user experience.

BRIEF DESCRIPTION OF DRAWINGS

The following further describes specific embodiments of the present invention in detail with reference to the accompanying drawings.

DETAILED DESCRIPTION OF EMBODIMENTS

To enable those skilled in the art to better understand the technical solution of the present invention, the present invention is further described in detail below in conjunction with the accompanying drawings and specific embodiments.

Figure 1:
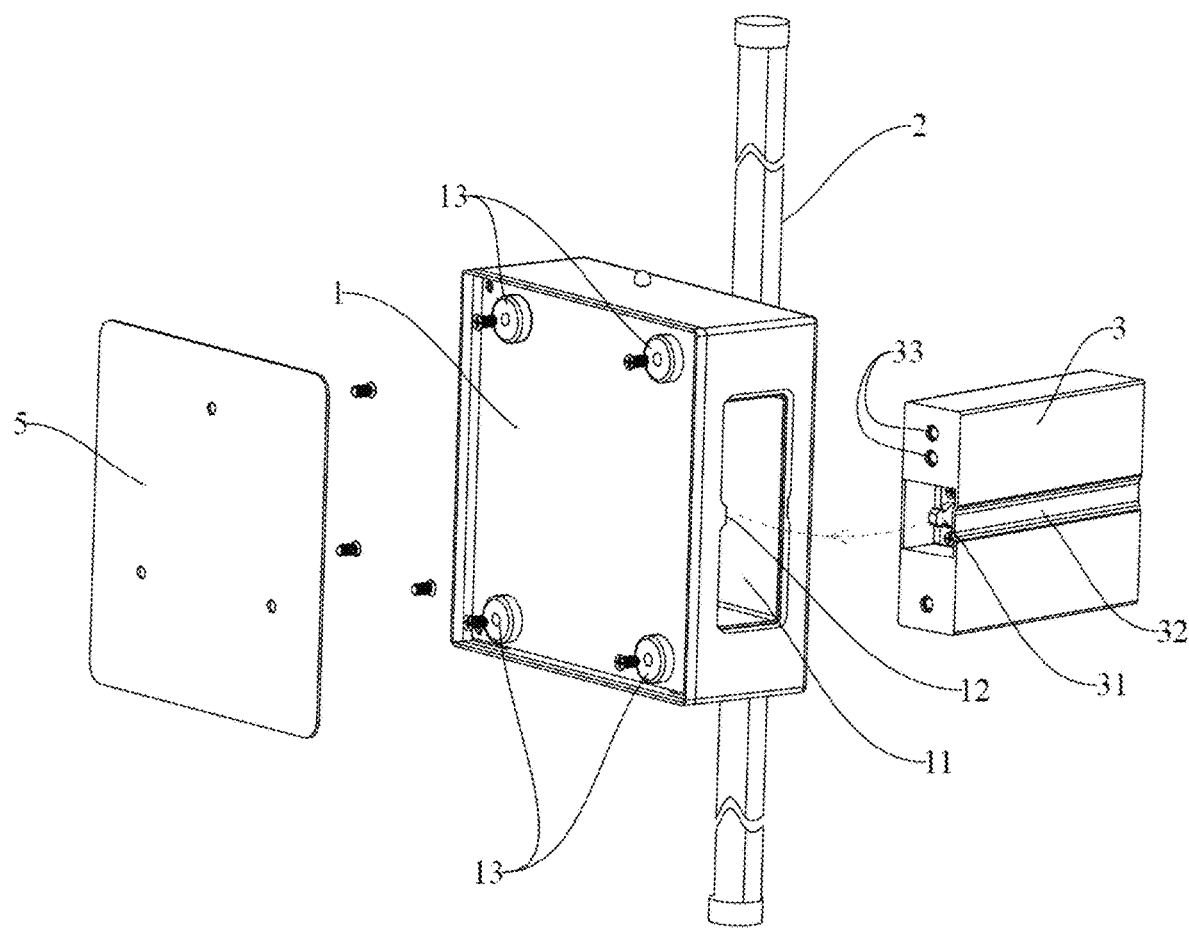
FIG. 1 is a schematic exploded view of the present invention.
Figure 2:
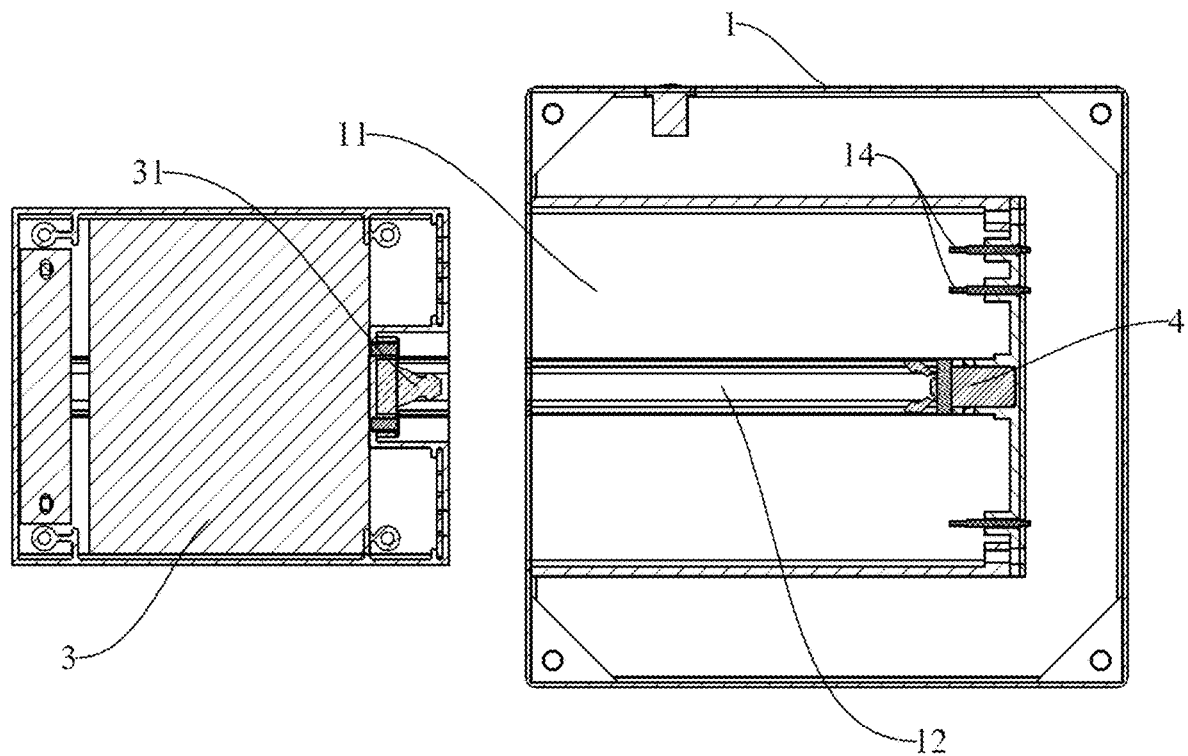
FIG. 2 is a schematic sectional view of the present invention.
Figure 3:
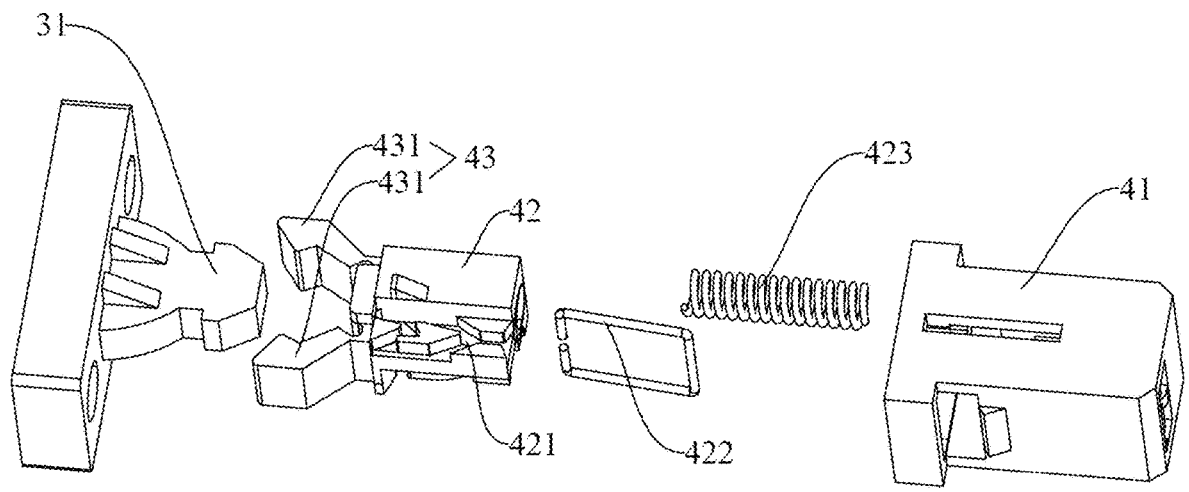
FIG. 3 is a schematic exploded view of a pressing-type elastic self-locking mechanism.
Figure 4:
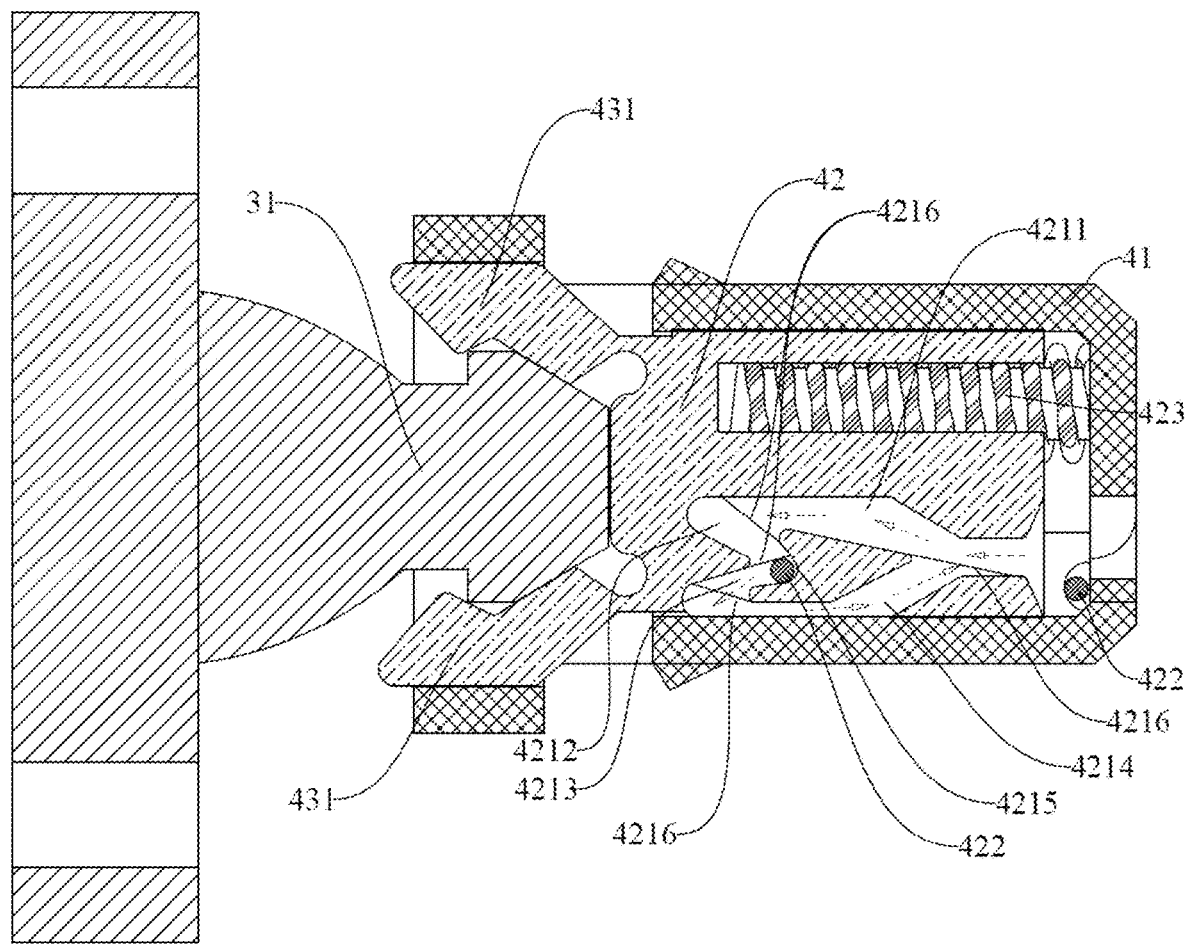
FIG. 4 is a schematic sectional view of a pressing-type elastic self-locking mechanism.

As shown in FIGS. 1 to 4, the present invention provides a lamp with a quick-release battery. The lamp mainly includes three main parts: a lamp holder 1, a lamp body 2, and a battery pack 3. The lamp has good modularity, and is convenient to assemble and maintain.

The lamp holder 1 is a basic part of the entire lamp. A battery compartment 11 is designed inside the lamp holder 1, and the battery compartment 11 is provided with an opening at one side for the battery pack 3 to be inserted and taken out smoothly.

The battery pack 3 is a power supply unit of the lamp. To achieve the function of quick assembly and disassembly, a sub-buckle 31 is arranged on the end face of the battery pack 3. The design of the sub-buckle 31 utilizes the principle of mechanical structure, and can achieve a quick and stable connection with a clamping component 4 on the lamp holder 1.

The clamping component 4 is a core part of the present invention and is mounted on a corresponding side wall of the battery compartment 11. The clamping component 4 mainly includes the following parts:
 (1) A clamping box 41: as a housing for the clamping component 4 and providing a mounting base for other components.
 (2) A sliding block 42: mounted in the clamping box 41 so as to slide inward and outward. The design of the sliding block 42 enables a push-type operation of the entire clamping mechanism.
 (3) A female buckle 43: arranged at an outer end of the sliding block 42, elastic, and extending out or retracting into the clamping box 41. When the female bucket is retracted into the clamping box 41, the female buckle 43 and the sub-buckle 31 can be mutually clamped, thereby achieving the fixation of the battery pack 3.
 (4) A pressing-type elastic self-locking mechanism: arranged between the sliding block 42 and the clamping box 41 and as a key component for achieving the quick disassembly and assembly function.

The battery pack 3 of the present invention is simple, convenient and quick in disassembly and assembly processes. When the battery is mounted, the battery pack 3 only needs to be pushed directly into the battery compartment 11, and the sub-buckle 31 on the end face of the battery pack 3 can automatically clamp to the female buckle 43 to achieve quick mounting. When the battery pack is disassembled, the battery pack 3 may be automatically popped up only by pressing the battery pack 3 again, and the battery pack can be easily taken out. This design greatly simplifies the battery replacement and charging process and improves the user experience.

The design inspiration of the push-type elastic self-locking mechanism comes from the push-pop-up structure of the SIM card slot. Specifically, the mechanism includes the following parts:
 (1) A guide groove 421: arranged on the sliding block 42 and as a track for movement of the pull rod 422.
 (2) A pull rod 422: mounted in the clamping box 41 by a rotary connection, a free end of which is inserted into the guide groove 421 and can slide unidirectionally along the guide groove 421.
 (3) A reset spring 423: arranged between the sliding block 42 and the clamping box 41 and elastically pressing the sliding block 42 outwards to ensure that the sliding block 42 is in an initial position when no external force is applied.

The guide groove 421 includes four interconnected sections:
 (1) A front extension section 4211: extending from backward to forward.
 (2) A rear turning section 4212: turning backward from the front extension section 4211.
 (3) A front turning section 4213: turning forward from the rear turning section 4212.
 (4) A rear extension section 4214: extending backward from the front turning section 4213.

These four sections are connected end to end in sequence to form a closed track. A stopping groove 4215 is further designed at the connection between the rear turning section 4212 and the front turning section 4213 for temporarily fixing the pull rod 422.

To further optimize the movement of the pull rod 422, steps 4216 that descend in sequence are arranged between the front extension section 4211 and the rear turning section 4212, between the rear turning section 4212 and the front turning section 4213, between the front turning section 4213 and the rear extension section 4214, and between the rear extension section 4214 and the front extension section 4211. This design enables the pull rod 422 to unidirectionally move more smoothly during the movement without moving in the opposite direction, and also provides a better positioning effect.

The female buckle 43 includes two elastic arms 431 arranged oppositely, and a space capable of accommodating the sub-buckle 31 is formed between the two elastic arms 431. When the female buckle 43 moves backward to retract into the clamping box 41, the two elastic arms 431 approach each other and clamp to the sub-buckle 31, thereby achieving a firm connection.

To ensure that the battery pack 3 can be inserted into the battery compartment 11 accurately, a guiding groove 32 is designed on a side surface of the battery pack 3, and correspondingly, a guide rail 12 that can slidably cooperate with the guiding groove 32 is arranged on a corresponding side surface of the battery compartment 11. This design not only ensures correct mounting of the battery pack 3, but also prevents damage due to incorrect operation.

The lamp of the present invention also takes mounting convenience into consideration. A mounting plate 5 is detachably connected to the lamp holder 1. The mounting plate 5 is typically mounted to a wall by fasteners, so that the entire lamp can be conveniently fixed in a desired position.

To further improve the mounting convenience, a magnetic connection structure is provided between the lamp holder 1 and the mounting plate 5. Specifically, a plurality of magnets 13 are arranged on the lamp holder 1, and the mounting plate 5 is made of iron. This design enables the lamp to be mounted and dismounted more simply and quickly, and the operation can be completed without using tools.

Finally, to ensure that the battery pack 3 can reliably supply power to the lamp, a conductive plug 33 and a conductive socket 14 which can be plugged into each other are respectively arranged on the battery pack 3 and a corresponding side wall of the battery compartment 11. This design not only ensures good electrical connection, but also prevents power supply problems due to poor contact.

In conclusion, the lamp with the quick-release battery provided by the present invention achieves quick disassembly and assembly of the battery pack by a smart structural design, and is greatly convenient for users to perform operations such as charging and battery replacement. Meanwhile, the modular design and magnetic mounting of the lamp with the quick-release battery also improve the overall use convenience of the lamp. This lamp is particularly suitable for scenarios where batteries need to be replaced frequently or used in different locations, and has broad application prospects.

The invention claimed is:

1. A lamp with a quick-release battery, comprising a lamp holder (1), a lamp body (2), and a battery pack (3), wherein a battery compartment (11) with an opening at one side and capable of allowing the battery pack (3) to be inserted is arranged in the lamp holder (1), a sub-buckle (31) is arranged on an end face of the battery pack (3), a clamping component (4) capable of being clamped and mated with the sub-buckle (31) is arranged on a corresponding side wall of the battery compartment (11), the clamping component (4) comprises a clamping box (41), a sliding block (42) capable of sliding inside and outside is arranged in the clamping box (41), an elastic female buckle (43) capable of extending out or retracting into the clamping box (41) and capable of being clamped and mated with the sub-buckle (31) when retracting into the clamping box (41) is arranged at an outer end of the sliding block (42), and a pressing-type elastic self-locking mechanism is arranged between the sliding block (42) and the clamping box (41).

2. The lamp with the quick-release battery according to claim 1, wherein the pressing type elastic self-locking mechanism comprises a guide groove (421) arranged on the sliding block (42), a pull rod (422) rotatably connected in the clamping box (41), and a reset spring (423) that is arranged between the sliding block (42) and the clamping box (41) and elastically presses the sliding block (42) outwards, and a free end of the pull rod (422) is inserted into the guide groove (421) and can slide unidirectionally along the guide groove (421); and the guide groove (421) comprises a front extension section (4211) extending from backward to forward, a rear turning section (4212) turning backward from the front extension section (4211), a front turning section (4213) turning forward from the rear turning section (4212), and a rear extension section (4214) extending backward from the front turning section (4213), the front extension section (4211), the rear turning section (4212), the front turning section (4213), and the rear extension section (4214) are connected end to end in sequence, and a stopping groove (4215) is provided at the connection between the rear turning section (4212) and the front turning section (4213).

3. The lamp with the quick-release battery according to claim 2, wherein steps (4216) that descend in sequence are arranged between the front extension section (4211) and the rear turning section (4212), between the rear turning section (4212) and the front turning section (4213), between the front turning section (4213) and the rear extension section (4214), and between the rear extension section (4214) and the front extension section (4211).

4. The lamp with the quick-release battery according to claim 1, wherein the female buckle (43) comprises two elastic arms (431) arranged oppositely, and a space for inserting the sub-buckle (31) is formed between the two elastic arms (431); and when the female buckle (43) moves backward to retract into the clamping box (41), the two elastic arms (431) approach each other and clamp the sub-buckle (31).

5. The lamp with the quick-release battery according to claim 1, wherein a guiding groove (32) is arranged on a side surface of the battery pack (3), and a guide rail (12) that can slidably cooperate with the guiding groove (32) is arranged on a corresponding side surface of the battery compartment (11).

6. The lamp with the quick-release battery according to claim 1, wherein the lamp holder (1) is detachably connected with a mounting plate (5) that can be mounted on a wall.

7. The lamp with the quick-release battery according to claim 6, wherein a magnetic connection structure for detachably connecting the lamp holder (1) and the mounting plate (5) is arranged therebetween.

8. The lamp with the quick-release battery according to claim 7, wherein the magnetic connection structure comprises a plurality of magnets (13) arranged on the lamp holder (1), and the mounting plate (5) is made of iron.

9. The lamp with the quick-release battery according to claim 1, wherein a conductive plug (33) and a conductive socket (14) which can be mutually plugged into each other are respectively arranged on the battery pack (3) and a corresponding side wall of the battery compartment (11).

* * * * *